United States Patent [19]
Fachini et al.

[11] Patent Number: 4,520,617
[45] Date of Patent: Jun. 4, 1985

[54] COTTON HARVESTER

[75] Inventors: Robert M. Fachini, Naperville; Monroe C. Barrett, Downers Grove; Maxwell D. McClure, III, Naperville, all of Ill.

[73] Assignee: J. I. Case Company, Racine, Wis.

[21] Appl. No.: 515,330

[22] Filed: Jul. 19, 1983

Related U.S. Application Data

[63] Continuation-in-part of Ser. No. 338,191, Jan. 11, 1982.

[51] Int. Cl.³ ............................................. A01D 46/08
[52] U.S. Cl. ........................................ 56/16.6; 56/28; 298/23 MD
[58] Field of Search .................... 56/16.6, 28, 30, 203, 56/214, DIG. 11; 198/312, 316, 313; 298/23 MD; 414/345, 347, 495, 470, 519, 525 R, 497; 105/240

[56] References Cited

U.S. PATENT DOCUMENTS

| | | | |
|---|---|---|---|
| 2,862,342 | 12/1958 | Fergason | 56/16.6 |
| 2,957,726 | 10/1960 | Fergason | 298/7 |
| 3,215,291 | 11/1965 | Nickle | 414/525 |
| 3,424,498 | 1/1969 | Maxon | 298/7 |
| 3,450,284 | 6/1969 | Diem | 414/497 |
| 3,530,652 | 9/1970 | Long et al. | 56/16.6 |
| 3,666,126 | 5/1972 | Rempel | 298/7 |
| 3,894,646 | 7/1975 | Heed et al. | 198/313 |
| 3,937,502 | 2/1976 | Gay | 414/470 |
| 4,241,566 | 12/1980 | Webster | 56/14.6 |
| 4,301,869 | 11/1981 | Dubois | 56/364 |

FOREIGN PATENT DOCUMENTS

1505365  2/1970  Fed. Rep. of Germany ........ 298/23 MD

Primary Examiner—Gene Mancene
Assistant Examiner—John G. Weiss
Attorney, Agent, or Firm—Dressler, Goldsmith, Shore, Sutker & Milnamow, Ltd.

[57] ABSTRACT

A self-propelled cotton harvester having a cotton receiving and unloading basket mounted for vertical movement between cotton-receiving and cotton-unloading positions in a level attitude wherein the basket comprises a chain conveyor for cotton unloading regardless of angle and moving load on the door in all basket height positions.

16 Claims, 6 Drawing Figures

FIG-6

COTTON HARVESTER

This is a continuation-in-part application of the application Ser. No. 338,191, filed on Jan. 11, 1982.

BACKGROUND OF THE INVENTION

1. Field of the Invention

The invention relates to cotton harvesters and more particularly to a unique basket mounting, moving, and unloading system.

2. Information Disclosure Statement

FIG. 2 of U.S. Pat. No. 4,059,942 typifies current cotton harvester unloading systems wherein the basket is pivotally mounted for swinging laterally of the machine to dump the load of cotton into a receiving wagon or module builder (not shown). It will be noted that the lid or top of the basket is also pivotally mounted to permit unloading and is itself shifted even further from the machine during unloading. The center of gravity of the basket is shifted laterally to such an extent as to create a problem in the stability of the machine. Indeed, the above patent offers a solution to the problem by using a stabilizing cylinder between the chassis and the rear wheel support beam.

U.S. Pat. No. 2,723,769 or 2,862,342 refers to the stability problem in cotton basket unloading. While this patent unloads the cotton differently than in U.S. Pat. No. 4,059,942, it retains the basic teaching of tilting the basket about a fore-and-aft axis. Moreover, the cotton must be moved upwardly out of the basket in its tilted discharge position.

A design goal for efficient cotton harvesters is to maximize the cotton storage capacity of the machine to reduce the frequency of stopping to unload. An aid toward this goal is the use of compactors as shown for example in U.S. Pat. No. 3,215,291. A greater degree of compaction could be obtained if the basket were a rigid unitary structure to withstand the loads imposed by compaction of the cotton. However, it will be noted that baskets in common commercial use today (the type shown in U.S. Pat. Nos. 3,215,291 and 4,059,942) have a hinged top which adds little or no rigidity to the basket since the top is merely pivotally connected thereto.

To summarize the problems associated with commercially known cotton harvester basket structure and function, the typical baskets in use today are of the so-called "side-dump" type which create stability problems during unloading. These baskets have pivotal tops which add to the stability problem and which do not have the rigidity to accommodate optimum compaction of cotton therein.

Even in the prior art (U.S. Pat. No. 2,723,769 above) which is not of the "side-dump" type, the function of tilting about a fore-and-aft axis remains and with the added problem of moving the cotton upwardly for discharge.

Discharging a load of crop material without tilting the bin structure is shown for example in U.S. Pat. No. 3,450,284. However, this is unrelated to cotton harvesting, or metering discharge via an extendable door system as disclosed hereinbelow.

SUMMARY

The invention relates to a cotton harvester having a unique means for discharging cotton. The problem of machine stability during unloading is virtually eliminated in the elimination of the pivotable basket known and used heretofore. The invention enhances stability of the machine by always retaining the cotton basket in a level attitude at every stage of the harvesting operation. A cotton accumulating basket has a door extending outwardly for a cotton discharge therethrough. A conveyor means facilitates a metering discharge of cotton in all basket height positions regardless of the door angular position and moving cotton load thereon. The invention includes interrelated means for compacting cotton.

DESCRIPTION OF THE INVENTION

The invention may be carried into practice in a number of ways but two specific embodiments shown in FIGS. 1–3 and FIGS. 4–6, respectively, will be described by way of example only.

Figure 1:
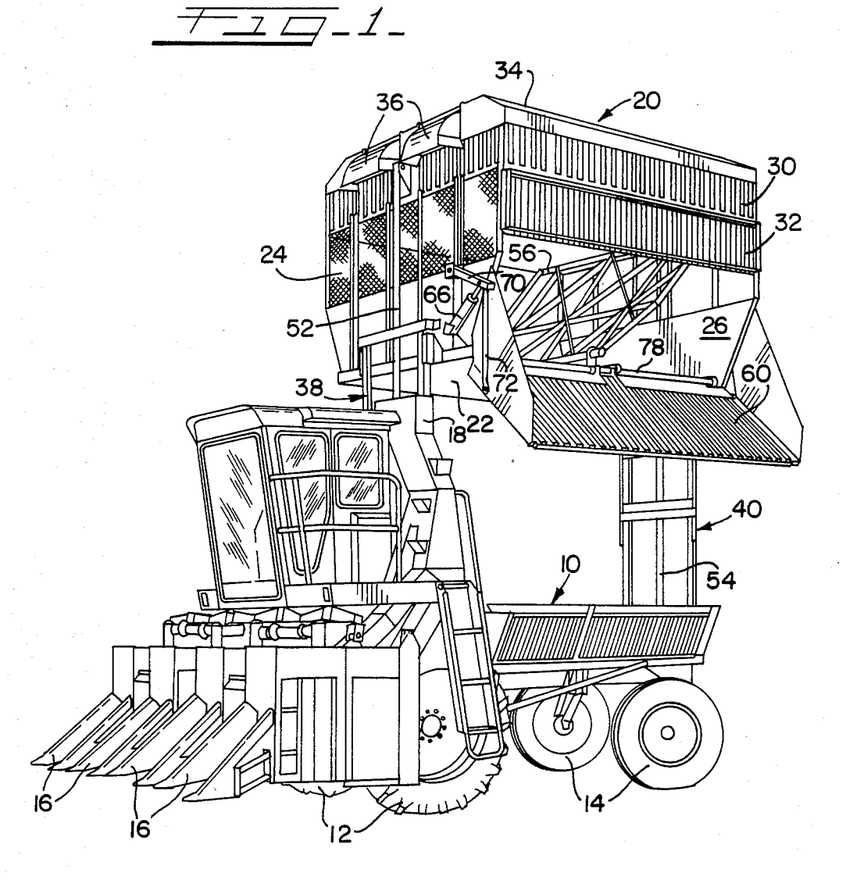
FIG. 1 is a perspective view of the improved cotton harvester of the invention.
Figure 2:
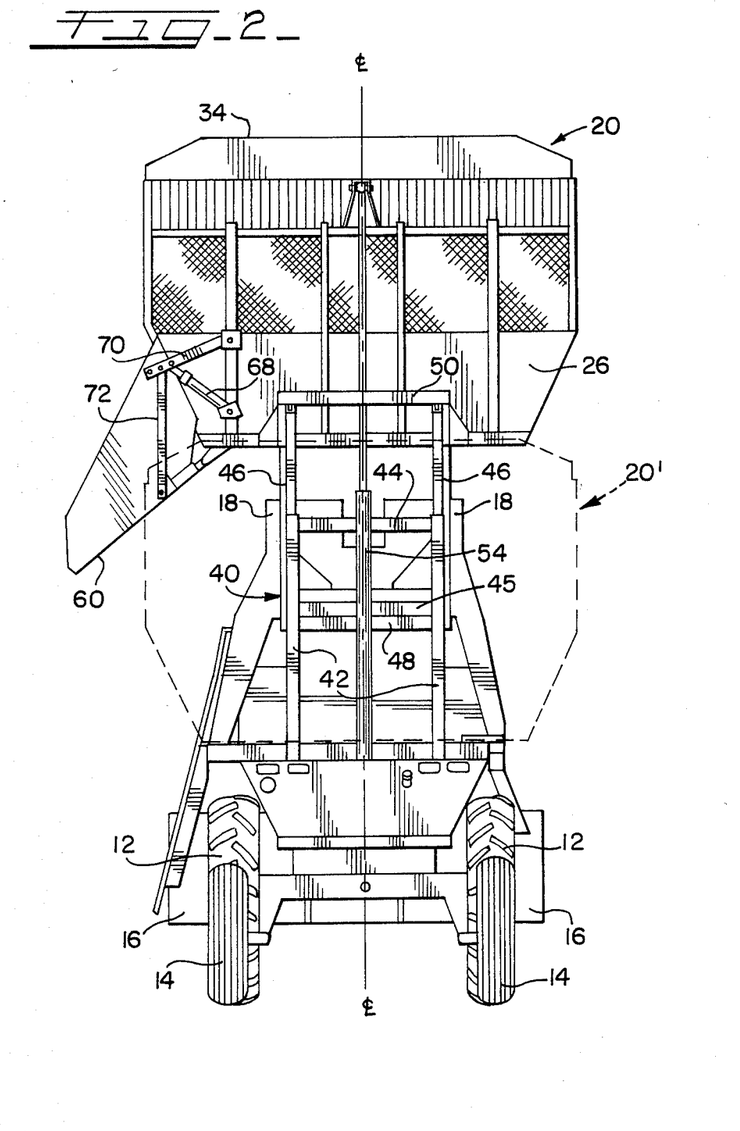
FIG. 2 is a rear elevation view of the harvester of FIG. 1 showing the cotton basket in a lower dotted line position for receiving cotton and in a raised solid line position for discharging cotton.
Figure 4:
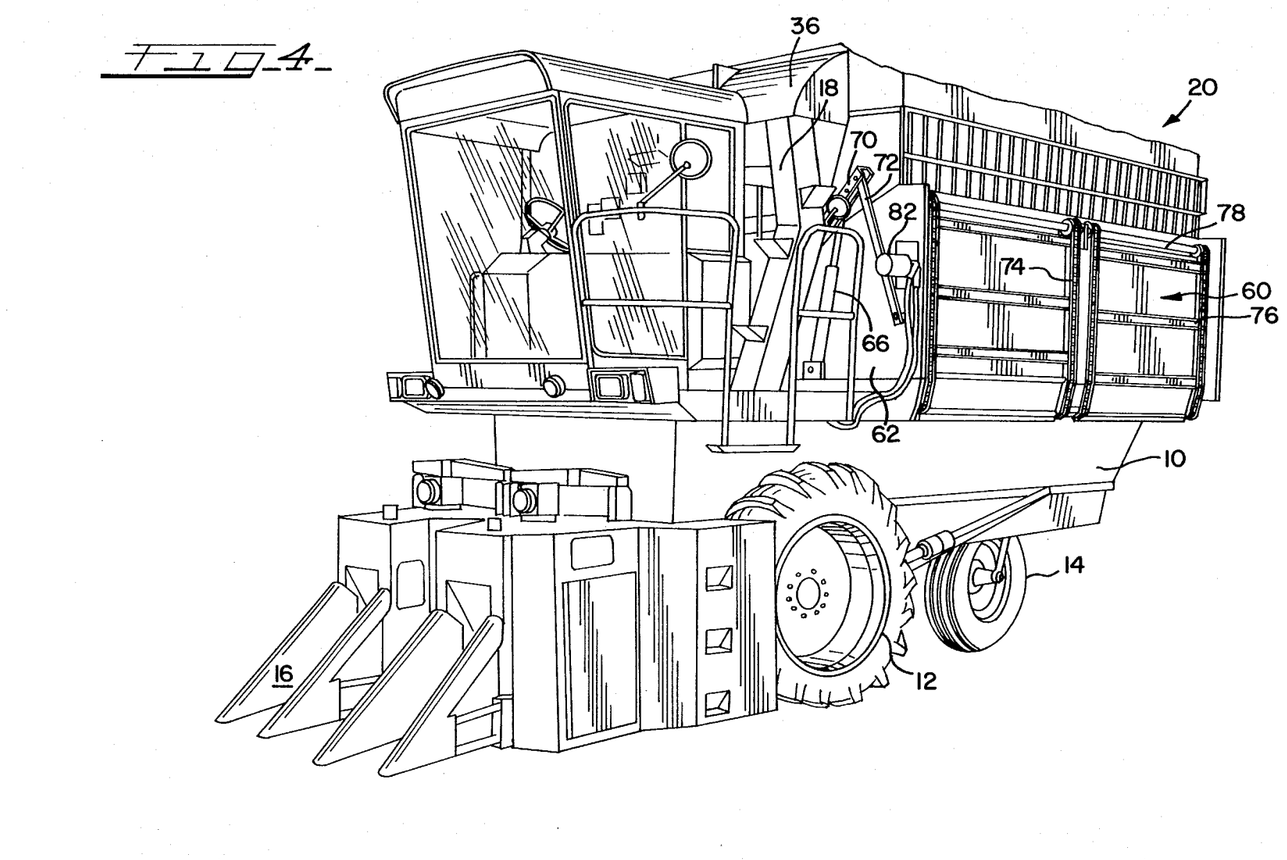
FIG. 4 is a perspective view of the second embodiment of the cotton harvester with a closed door.

Referring now to the drawings wherein reference characters designate like or corresponding parts throughout the several views, there is shown in FIGS. 1 and 4 a cotton harvester having a self-propelled chassis 10 supported on a pair of front drive wheels 12 and a pair of rear steerable wheels 14. The wheels of each pair are laterally spaced equidistantly from a fore-and-aft extending vertical plane disposed vertically of the harvester along the centerline as shown in FIG. 2. The harvester includes a plurality of cotton harvesting units 16 disposed along the front of the machine for harvesting rows of cotton as the harvester is driven through the field. The cotton is conveyed through suitable ducts 18 into a cotton receiving basket 20 when in the lowered position.

Figure 3:
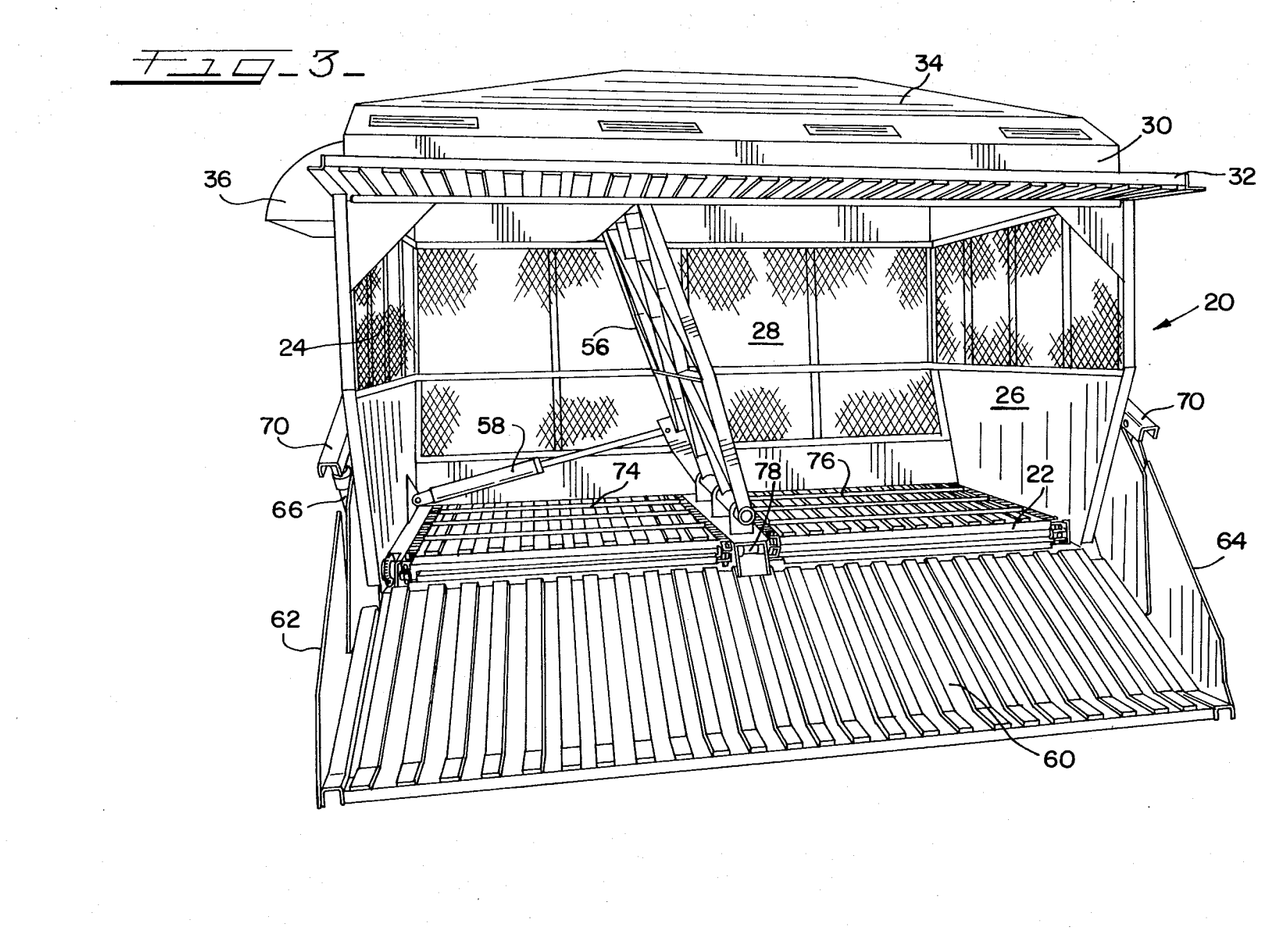
FIG. 3 is an enlarged perspective view of the cotton basket of the harvester.

The basket 20 includes a floor 22, as better shown in FIGS. 2, 3 and 5, 6, from which a front wall 24, a rear wall 26, and a side wall 28 extend upwardly. Another side wall 30 extends between the front and the rear walls and includes a panel 32, with a rubber lip 33 in FIG. 6, pivotally mounted to swing outwardly as shown in FIG. 3. It will be noted that the panel 32 is spaced above the floor of the basket to define a crop discharge opening in the side of the basket. A roof structure 34 is secured to the top edges of the walls 24, 26, 28 and 30 so as to define therewith a rigid unitary basket structure. It will be seen in FIGS. 1 and 4 that a pair of crop inlet hoods 36 are secured to the front wall 24 of the basket. The hoods 36 communicate with the tops of crop conveying ducts 18 when the basket is lowered thus providing an inlet means into the basket for the cotton.

The basket 20 is mounted on the harvester rearwardly of the ducts 18 by means of forward and rearward mast structures 38 and 40, respectively. Each of the mast structures includes interfitting frame sections secured to the chassis and the basket. More specifically, the frame section secured to the chassis consists of a pair of vertical channel members 42 interconnected by horizontal cross braces 44 and 45. The frame section secured to the basket consists of a pair of vertical members 46, which are interconnected by cross-braces 48 and 50 in the embodiment seen in FIGS. 1–3. The vertical members 46 have rollers (not shown) riding in the channel members 42 of the chassis-mounted frame section so that the basket is constrained and guided for vertical movement relative to the chassis.

The basket 20 is vertically moveable by means of a pair of vertical hydraulic cylinders 52 and 54 disposed respectively at the front and rear of the basket adjacent to the respective mast structures 38 and 40. It will of course be understood that the cylinders 52 and 54 are supplied with hydraulic pressure fluid from a suitable hydraulic system in the harvester.

As shown generally in FIG. 1 and more specifically in FIG. 3 an open framework type compactor vane 56 is pivotally mounted on the floor 22 of the basket approximately midway between the front and rear walls 24 and 26. A hydraulic cylinder 58 is connected between the front wall 24 and vane 56 adjacent to the side wall 28 to oscillate the vane back and forth to compact cotton within the basket and thus increase the effective capacity of the basket.

The basket 20 includes a door 60 pivotally mounted adjacent to the edge of the floor 22 and moveable between a raised position closing the crop discharge opening and a downwardly inclined position shown in FIGS. 1 and 3. Vertical side sheets 62 and 64 are secured at the opposite ends of the door 60 for purposes to be described. The door 60 is moved between its raised and lowered positions by hydraulic cylinders 66 and 68 mounted on the front and rear walls respectively of the basket. The cylinders 66 and 68 are each connected to a linkage including a lift arm 70 pivotally mounted on the respective end wall of the basket and another lift arm 72 pivotally connected between the arm 70 and the end of the door 60. The cylinders 66 and 68 are supplied in unison with hydraulic pressure fluid from the hydraulic system of the harvester and are actuated by the operator of the machine to raise and lower the door as required.

Figure 5:
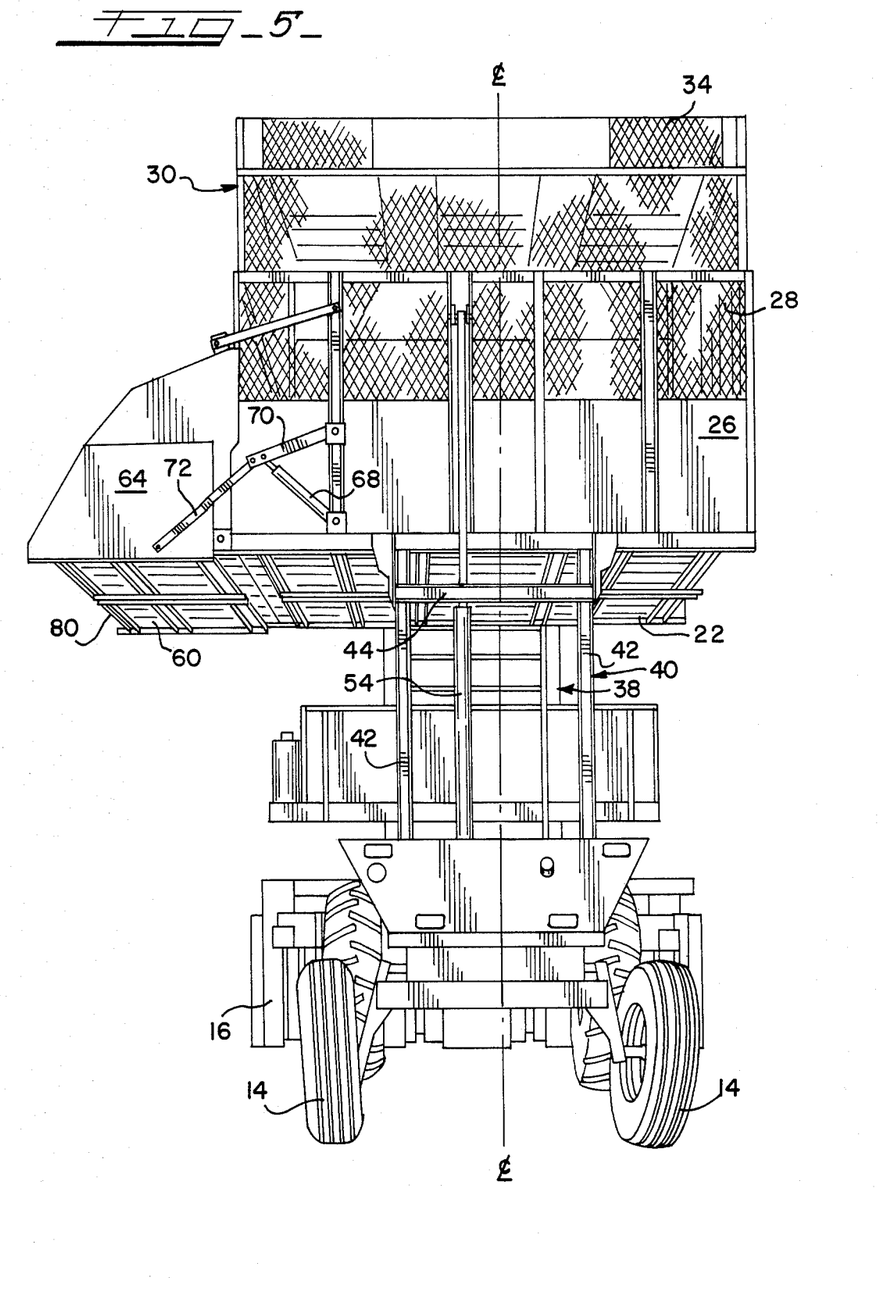
FIG. 5 is a rear elevational view of the harvester of FIG. 4 showing the cotton basket in a raised position with the door being open for discharging cotton.
Figure 6:
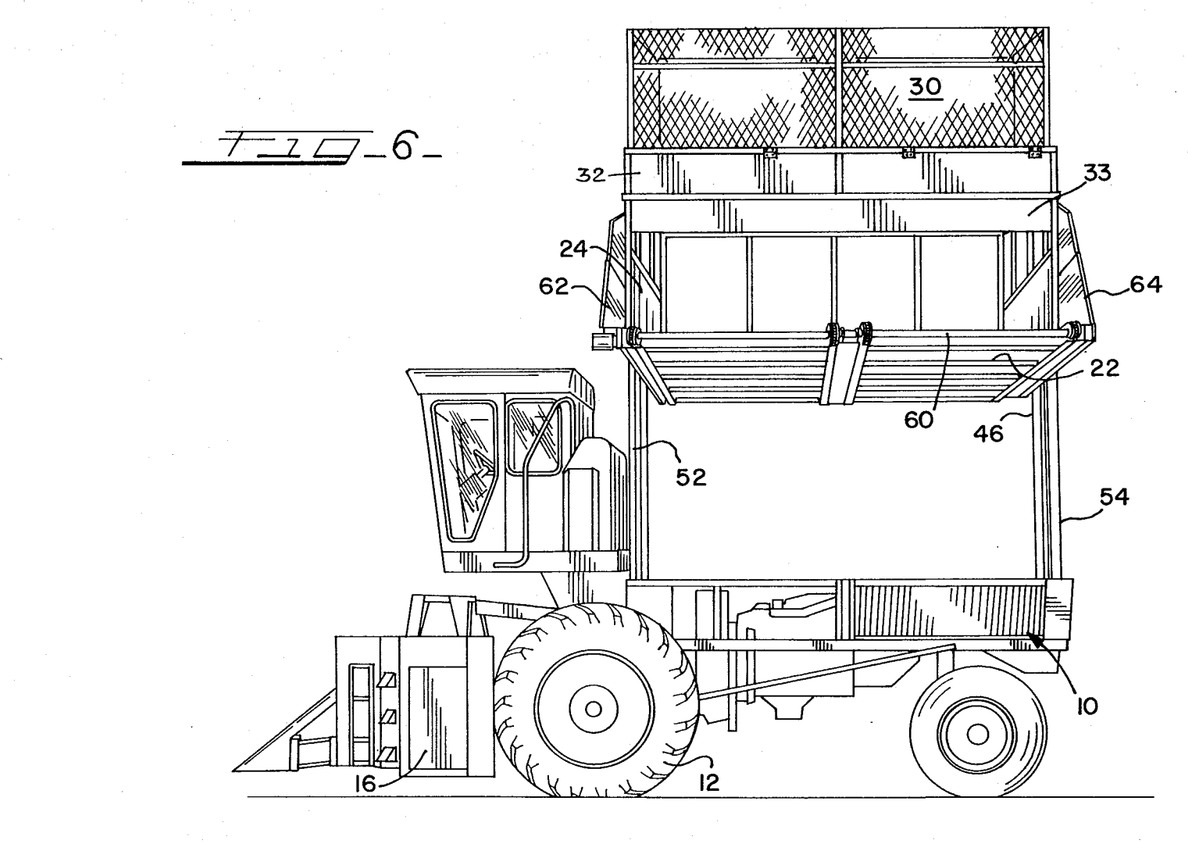
FIG. 6 is a side elevational view of the harvester shown in FIG. 5.

As best seen in FIG. 3 the basket 20 is provided with an endless chain conveyor having chain and slat sections 74 and 76 which encircle the floor of the basket and, as illustrated in FIGS. 4–6 also door 60. The conveyor sections 74 and 76 are driven from a common shaft 78 extending the length of the basket along the door edge 80 and powered by a rotary hydraulic motor 82 mounted on one side of the door 60.

In operation cotton is harvested and conveyed into the basket in its lowered position. When it is desired to unload the basket into a waiting wagon or module builder, the basket lift cylinders 52 and 54 are extended and the basket is raised in a vertical path in a level attitude to the raised position shown in FIGS. 2 and 3. The compactor vane 56 is moved to a vertical position in the basket. The door 60 is lowered to a position which may be anywhere between horizontal and inclined upwardly as shown depending on the fill up and height of the receiving wagon or module builder. The endless chain conveyor is then actuated to move the cotton laterally from the basket and across the door 60 into the receiving container. The vertical position of the compactor vane 56 minimizes interference with the cotton. It must be understood that the basket can operate with other types of a compactor or without it at all. The side sheets 62 and 64 of the door 60 serve to guide the cotton as it moves along the door. The panel 32 is free to swing outwardly as the cotton is moved from the basket.

Unlike commercially existing cotton harvesters with dump type baskets, the center of gravity of the basket and load of cotton does not move laterally of the machine when the basket is in its unloading position. The degree of incline of the door 60 and the speed of discharge conveyors 74 and 76 can be varied to more effectively control the rate of discharge of the cotton. Indeed, it is possible to discharge only portions of the load of cotton at any time as dictated by the remaining capacity of the receiving container. With dump type baskets such partial unloading is difficult to accomplish since the entire load tends to be discharged when the basket is tilted. Since the basket of the present invention does not require a pivotable roof as in dump type baskets, the basket can be constructed as a rigid structure better able to withstand loads imposed by compacting cotton therein.

The chain conveyors metering the cotton discharge and angularly moveable with the door operate independently of the control system rotating the door. Thus the conveyors can work even when the door is closed.

The side wall 30 blocks an outward movement of cotton, thereby pushing an upper portion of a cotton heap back toward the side wall 28. The cotton falls behind the floor adjacent portion moving through the discharge opening. Thus the side wall 30 forces the cotton discharge of only a selected section thereof.

The hydraulic cylinders 54 attachment to the basket is offset toward the door, as best shown in FIG. 5, in order to more evenly accommodate a load shift by placing it within the range of a moving center of gravity of the basket with dischargeable cotton. The offset reduces a rotating moment caused by a load placement on a door and consequently diminishes a need for a counterbalancing structure.

While two embodiments of the invention have been illustrated and described herein, various changes and modifications may be made therein without departing from the spirit of the invention as defined by the scope of the appended claims.

What is claimed is:

1. In a cotton harvester having a wheeled chassis, a picking unit for harvesting cotton, a conveyor operably connected to the picking unit, and a unitary basket having a floor and upwardly extending walls for collecting cotton from the conveyor, the combination of means for raising the basket in a constant angle position to a cotton discharge position, means for discharging cotton from the basket in a controllable fashion while the basket remains in the same constant angle position, and control means for opening and closing said basket regardless of said basket elevation and speed of dischargeable cotton.

2. The subject matter of claim 1, including mast structures on the chassis guiding vertical movement of the basket in a straight vertical path wherein the center of gravity of the basket does not shift laterally relative to the chassis and the center of gravity of cotton in said basket gradually moves down during said cotton discharge, and means forcing said cotton to collapse and drop out of said basket within the confines thereof.

3. The subject matter of claim 1, and said means for discharging cotton comprising:

a basket door convertible into a remotely and angularly adjustable extension facilitating cotton discharge in a plurality of basket height positions and with any load concentration on said door in said discharge position; and urging means for moving said cotton out of said basket till an end of said extension.

4. In a cotton harvester having a chassis with forward drive wheels and rearward steerable wheels, a picking unit for harvesting cotton, a conveyor operably connected to the picking unit, and a basket for collecting cotton from the conveyor, the improvement comprising first and second vertical mast structures spaced from each other longitudinally on the chassis with said basket being disposed therebetween, means telescopically interconnecting said basket with the first and second mast structures in a level attitude along a straight line vertical path, a cotton discharge opening defined in a side of the basket, a conveyor means for gradual discharging of cotton from the basket through the discharge opening, an angularly and remotely adjustable basket door closing said discharge opening regardless of said basket elevation and moving cotton load thereon, and side guide means connected to said basket door at the opposite ends thereof for guiding said cotton moving along said door.

5. In a cotton harvester having a wheeled chassis with a centrally disposed fore-and-aft extending vertical plane and including rear mounted steerable wheels spaced apart laterally of the vehicle equidistantly from said plane, a picking unit, picked cotton conveyor operatively connected to the picking unit, and a basket for collecting cotton from the conveyor, the improvement comprising means mounting the basket on the chassis with the center of gravity of the basket being disposed in said vertical plane, means for moving said basket from a lowered crop receiving position to a raised crop discharge position in a straight line path wherein the center of gravity of the basket remains in said vertical plane thereby enhancing the lateral stability of the harvester and the center of gravity of cotton in said basket moves gradually down during the discharge of said crop, a basket door angularly adjustable to facilitate cotton discharge in any altitudinal position and closeable with any amount of cotton thereon, and side wall means forcing said cotton to be discharged through a basket discharge opening.

6. In a harvester, the combination of a harvester material basket having a floor supporting spaced side and end walls and a top wall joined thereto to define a rigid unitary structure adapted for receiving crop material, crop inlet means defined in said basket for admitting crop material, a crop discharge opening defined in one of said side walls, a crop discharge conveyor means disposed in said basket for moving crop material from the basket through said discharge opening said basket being moveable without angular displacement thereof relative to said harvester longitudinal axis in all positions, and a basket door convertible into an angularly adjustable extension and closeable regardless of speed basket altitude, and amount of crop material thereon.

7. The subject matter of claim 6, including a door pivotally mounted adjacent said floor on a horizontal axis along the bottom edge of said discharge opening, means for pivoting said door between a raised position closing said discharge opening and a lowered position extending laterally from the floor and defining a discharge ramp for the crop material so as to allow only floor-adjacent portion of said crop material to move out of said basket, said conveyor means for moving crop out of said basket being disposed within confines thereof, and a side wall member located above said door.

8. In a cotton harvester having a power operated picking unit, picked cotton conveying means operatively connected to the picking unit, and a basket on the harvester for receiving cotton from the conveying means and periodically discharging cotton from the harvester, the improvement comprising means mounting said basket on the harvester for vertical movement in a straight line path between a lowered cotton receiving position and a raised cotton discharging position; said basket including a pair of sidewalls, a forward wall, a rearward wall, and a top wall and a floor interconnected to form a unitary rigid structure; a cotton discharge opening defined in one of said sidewalls having a lower edge disposed along said floor; a door pivotally mounted adjacent said floor on a fore-and-aft axis at the lower edge of said discharge opening, means for selectively pivoting said door at any altitudinal level between a raised position corresponding to closing said discharge opening and a lowered position for defining a cotton discharge extension laterally from the basket; a discharge conveyor operative to move cotton along the floor through the discharge opening and across the door when in its lowered position whereby the cotton is discharged from the basket in an essentially horizontal plane, said door closing a lower portion of said discharge opening; a side wall panel being pivotally moveable and closing an upper portion of said discharge opening; and a side wall rigid member located above said panel and defining with other side walls a unitary basket structure.

9. The subject matter of claim 6, wherein a cotton compacting vane structure pivotally mounted on said basket and pivotable in operation back and forth in the basket to compact cotton therein.

10. In a cotton harvester with a crop gathering system delivering picked cotton into a cotton accumulating basket, said basket being vertically moveable and comprising:
vertically extending side walls, floor and head structures, said basket being moveable between its lowered and raised positions by mast assemblies disposed at opposite ends of said basket;
a cotton inlet means conveying with conveying duct units stationary mounted on said harvester;
a side wall door covering a discharge opening in one of said side walls;
a chain conveyor means mounted on said floor structure for moving cotton out of said basket through said discharge opening;
control means for moving and retaining said door in any angular position at any basket altitude between said door open and closed positions, said chain conveyor connected with said door and angularly moveable therewith for discharging cotton under any angle between said door open and closed positions; and
conveyor actuating means regulating operation of said conveyor and working independently of said control means and said door positions.

11. The invention in accordance with claim 10, and said conveyor actuating means comprising a motor assembly located within the boundaries of said door.

12. The invention in accordance with claim 10, and said door being aligned with said floor structure in its open position and side guide means rigidly attached to said door opposite ends for guiding cotton moving along said door.

13. The invention in accordance with claim 10 and a side wall section disposed above said discharge opening and pushing an upper portion of dischargeable cotton toward an opposite side wall.

14. In a cotton harvester with a crop gathering system delivering picked cotton into a cotton accumulating basket, said basket being vertically moveable and comprising:

vertically extending side walls, floor and head structures;

mast assemblies disposed at opposite ends of said basket, said basket being moveable thereon between its lowered and raised positions;

a cotton inlet means conveying with conveying duct units stationary mounted on said harvester;

a side wall door covering a discharge opening in one of said side walls, said door being aligned with said floor structure in its open position;

a chain conveyor means mounted on said floor structure for moving cotton out of said basket through said discharge opening;

control means for moving and retaining said door in any angular position at any basket altitude between said door open and closed positions, said chain conveyor connected with said door and angularly moveable therewith;

conveyor actuating means regulating operation of said conveyor and working independently of said control means and said door positions, said conveyor actuating means comprising a motor assembly located within the boundaries of said door;

side guide means rigidly attached to said door opposite ends for guiding cotton moving along said door;

a side wall section disposed above said discharge opening and pushing an upper portion of dischargeable cotton toward an opposite side wall, thereby letting out only a floor adjacent portion of said cotton.

15. In a cotton harvester with a crop gathering system delivering picked cotton into a cotton accumulating basket, said basket being vertically moveable and comprising:

vertically extending side walls, floor and head structures;

mast assemblies disposed at opposite ends of said basket, said basket being moveable thereon between its lowered and raised positions;

a cotton inlet means conveying with conveying duct units stationary mounted on said harvester;

a side wall door covering a discharge opening in one of said side walls;

a chain conveyor means mounted on said floor structure for moving cotton out of said basket through said discharge opening;

control means for moving and retaining said door in any angular position between said door open and closed positions at any basket altitude, said chain conveyor connected with said door and angularly moveable therewith for cotton discharge in said angular positions;

conveyor actuating means regulating operation of said conveyor and working independently of said control means and said door positions; and said mast structures comprising a basket raising mechanism secured to said basket and offset from said basket central plane toward said door.

16. The invention in accordance with claim 15, and said conveyor means comprising two conveyors with a common drive shaft located near an outer edge of said door and driven by a motor mounted on one side of said door.

* * * * *

UNITED STATES PATENT AND TRADEMARK OFFICE
CERTIFICATE OF CORRECTION

PATENT NO. :   4,520,617
DATED      :   June 4, 1985
INVENTOR(S):   R. M. Fachini et al.

It is certified that error appears in the above-identified patent and that said Letters Patent is hereby corrected as shown below:

The words and punctuation "basket altitude," in Claim 6, Column 5, line 61, should have been printed instead, in Column 5, line 60, between the words "of" and "speed".

Signed and Sealed this

Twenty-ninth Day of September, 1987

Attest:

DONALD J. QUIGG

Attesting Officer

Commissioner of Patents and Trademarks